United States Patent
Engels

[15] 3,659,472
[45] May 2, 1972

[54] TIMING BELT ASSEMBLY
[72] Inventor: Walter Engels, New York, N.Y.
[73] Assignee: Ing. C. Olivetti & C., S.p.A., Ivrea, Italy
[22] Filed: Sept. 14, 1970
[21] Appl. No.: 72,060

[52] U.S. Cl. ............................................74/231 C, 74/258
[51] Int. Cl. ......................................F16g 1/28, F16g 13/02
[58] Field of Search ....................74/219, 231 C, 231 P, 258

[56] References Cited

UNITED STATES PATENTS

| | | | |
|---|---|---|---|
| 2,879,129 | 3/1959 | Alden | 74/231 C |
| 2,363,043 | 11/1944 | Clark | 74/258 X |
| 3,391,863 | 7/1968 | Huffman et al. | 74/219 X |
| 3,026,737 | 3/1962 | Berg | 74/231 C |
| 3,245,518 | 4/1966 | Reibel et al. | 74/231 C X |

Primary Examiner—Leonard H. Gerin
Attorney—Kevin McMahon

[57] ABSTRACT

This application sets forth a timing belt assembly having an attachment fitted to the timing belt to transmit the timing belt displacement to any piece of equipment coacting with the timing belt. The displacement transmitting attachment can be used to index, actuate switches, move slides or sleeves, or any of a wide variety of other operations, in accordance with the displacement of the timing belt. The pulleys on which the timing belt is mounted include special recesses which accommodate the displacement transmitting attachment of the timing belt to assure proper seating of the attachment when that portion of the timing belt, with the attachment thereon, engages the pulleys.

9 Claims, 7 Drawing Figures

PATENTED MAY 2 1972

3,659,472

INVENTOR
WALTER ENGELS
BY Kevin McMahon
ATTORNEY

TIMING BELT ASSEMBLY

BACKGROUND OF THE INVENTION

1. Field of the Invention

This invention relates to power transmission equipment in general, and to timing belt assemblies in particular.

2. Description of the Prior Art

In the recent past, timing belts and apparatuses using timing belts have become increasingly important in the power transmission field. For example, the use of timing belts in relatively high-speed office equipment has been found to be especially advantageous because timing belt assemblies are relatively inexpensive to manufacture and install, have positive power transmission characteristics, operate quietly, and require a minimum of maintenance.

However, the use of timing belts has been limited because it has been difficult to adapt them to installations which require a particular inter-relation between the timing belt and coacting equipment. Timing belts are manufactured by mass production methods which cannot efficiently produce small batches of a product. Accordingly, it is economically unfeasible for manufacturers to produce timing belts modified for particular applications. For example, it is economically impractical to purchase timing belts which incorporate a protrusion on the timing belt to transmit the displacement of the timing belt to a coacting piece of apparatus, for performing indexing, actuating or other operations.

Because of this adaptation difficulty of timing belts, chain drives have often been used in preference to timing belt assemblies, though the chain drives were less suitable in many other respects. Chain drives have long been able to incorporate various attachments or projections in the chain to integrate the chain drive with other coacting apparatuses. An example of such a chain drive is shown in U.S. Pat. No. 1,956,714 issued to W. S. Graff-Baker for a Mechanical Transmission System.

BRIEF DESCRIPTION OF THE INVENTION

In order to overcome the problems inherent in the prior art, the present invention sets forth a timing belt assembly in which a device is fastened to the timing belt to transmit the displacement of the timing belt to adjacent apparatus coacting with the timing belt. The pulleys of the timing belt assembly are adapted to accommodate the displacement transmitting device when the portion of the timing belt carrying the device is engaged with the pulley.

Accordingly, it is an object of the present invention to provide a timing belt assembly which permits the displacement of the timing belt to be transmitted efficiently, reliably, and inexpensively to adjacent equipment coacting with the timing belt.

Another object of the present invention is to provide a simplified apparatus for allowing displacement of a timing belt apparatus to be transmitted to adjacent coacting apparatus.

Yet another object of the present invention is to provide a timing belt assembly which can be easily adjusted to transmit the displacement of the timing belt to adjacent coacting apparatuses.

Yet another object of the present invention is to provide an attachment for a timing belt assembly to transmit displacement of the timing belt assembly to coacting apparatus, which timing belt attachment does not in any way structurally weaken the timing belt, or require extensive modification of the timing belt operation.

Still another object of the present invention is to provide a timing belt assembly which can be used to perform a variety of applications, such as indexing, switching, lineally displacing coacting equipment, and many other functions.

Yet another object of the present invention is to provide a device to transmit the displacement of a timing belt which can be easily installed or removed from timing belts.

Other objects and advantages will be apparent from the following description of an embodiment of the invention and the novel features will be particularly pointed out hereinafter in connection with the appended claims.

DESCRIPTION OF PREFERRED EMBODIMENT

Figure 1:
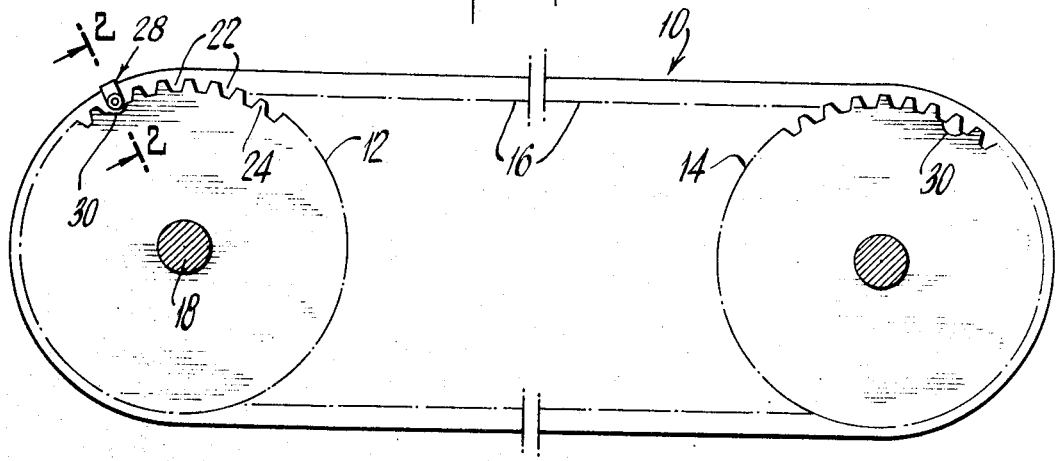
FIG. 1 is a side view, showing a timing belt assembly built in accordance with the teachings of the present invention.

FIG. 1 shows a belt and pulley assembly, generally indicated as 10, consisting of two externally geared pulleys 12 and 14, communicated by a timing belt 16. For purposes of this description, we shall consider the forward pulley 12 mounted on axle 18 as the drive pulley and the rear pulley 14 mounted on axle 20 as the driven pulley. Timing belt 16 has internal teeth 22 which engage with teeth 24 on each of the pulleys, thereby providing a positive mechanical connection between the two pulleys.

Although the invention is described herein in the form of a belt and pulley assembly composed of a timing belt and two geared pulleys, it should be understood that the principle of the invention is applicable to any belt and pulley assembly or to many other types of power transmission apparatuses in which a flexible member is used to connect two rotation centers.

Figure 3:
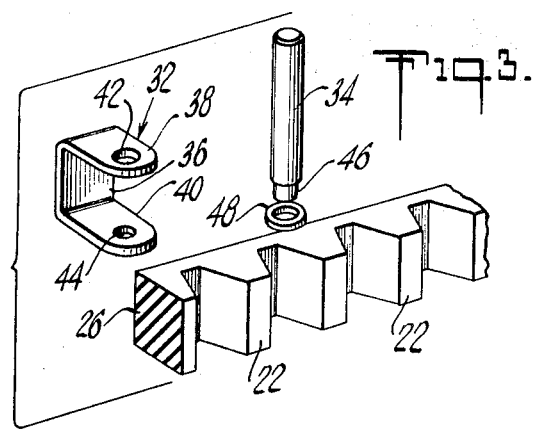
FIG. 3 is an exploded view of the timing belt assembly shown in FIG. 2.

Timing belt 16, more clearly shown in FIG. 3, is a standard, commercially available timing belt made from flexible material having a flat back surface 26 and a plurality of teeth 22 extending towards the center of the area encompassed by the belt. A belt displacement transmission means 28 is fastened to timing belt 16, and each of the pulleys include a receptacle 30 means for accommodating said transmission means.

Figure 2:
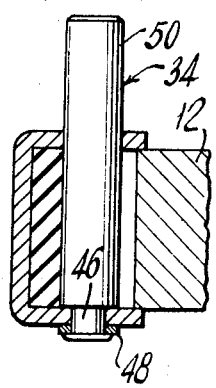
FIG. 2 is a view taken along line 2—2 of FIG. 1.

FIG. 2 shows the belt displacement transmission means 28 installed on timing belt 16 and coacting with one of the pulleys. As shown in FIG. 3, the belt displacement transmission means 28 consists of a U-shaped member 32 and a transmitting member 34 which are assembled to form a clamp around the timing belt, while leaving a portion 50 of transmitting member 34 extending beyond timing belt 16 to transmit the displacement of the belt. The U-shaped member 32 has a flat back end 36, adapted to fit against the flat back surface 26 of timing belt 16, and two arms 38 and 40 for the upper and lower arms respectively, which extend perpendicular to the flat back of U-shaped member 32. Both the upper and the lower arms have holes 42 and 44 respectively drilled near the ends of the arms, which holes are adapted to accommodate the transmitting member 34. As shown in FIG. 2, lower hole 44 is smaller than the upper hole 42 to accommodate the thinner bottom portion 46 of the transmitting member. A locking device 48 is then fastened to bottom end 46 of the transmitting member 34 to hold the member securely in place. Transmitting member 34 coacts with the arms of the U-shaped member to clamp U-shaped member 32 securely around timing belt 16. Teeth 22 of the timing belt on adjacent sides of the U-shaped member 32 prevent any possibility of U-shaped member 32 moving from its location on the timing belt.

The projecting end or actuating head 50 of transmitting member 34, projecting from timing belt 16, is used to actuate a wide variety of devices and thereby synchronize their operation with the displacement of the timing belt or the rotation of the pulleys. The force exerted on the projecting end 50 of the transmitting member by the coacting device when in contact with each other produces a torque on the transmitting means 34 which is resisted by teeth 22 of the timing belt on either side of the belt displacement transmission means 28.

As shown in FIG. 1, an external gear tooth is removed from each pulley to form a receptacle means 30 to accommodate the belt displacement transmission means 28. The root section of the missing tooth on each pulley is machined to accommodate the transmitting member 34 so that the portion of the timing belt where the transmitting member 34 is installed will mesh effectively with the drive or driven gear pulley. As shown in FIG. 2, transmitting member 34 fits into the receptacle means 30 in the pulley while the teeth 24 on either side of receptacle means 30 engage in the proper manner with teeth 22 of the timing belt.

Although FIG. 1 shows the drive and driven gear pulleys having the same pitch diameter and therefore the same rate of rotation, or a one-to-one gear ratio, this need not be the case for proper operation of the invention. There are several different gear ratios available between the drive and driven pulleys which would allow the belt transmission means 28 to engage each of the pulleys at the same location during each cycle of the timing belt. Additionally, multiple receptacle means 30 can be machined into one or both of the pulleys to accommodate belt transmission means 28 at different points in the circumference of the pulley. Therefore, the belt transmission means 28 need not engage the pulley in the same place on each revolution. Further, it is possible to install several belt displacement transmission means on a timing belt as long as the position and number are coordinated with the number and location of the receptacle means in the pulleys.

Installation of belt displacement transmission means 28 is extremely simple and adjustments can easily be made in the length of the transmitting member. Additionally, embodiments of the transmitting member can be easily fabricated in accordance with particular requirements of specific applications. The transmitting member and the U-shaped member can be fabricated from steel, other metals, or a wide variety of materials, such as plastics, or even hard rubbers.

In FIGs. 4, 5, 6 and 7, additional embodiments of the invention are shown. For purposes of simplicity, items in FIGS. 4 through 7 which have been previously described will be designated with the same number as previously used.

Figure 4:
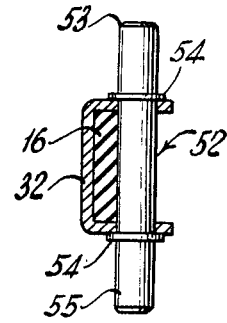
FIG. 4 is a sectional view of another embodiment of the invention, incorporating separate locking devices.

In FIG. 4, metallic U-shaped bracket 32 is fitted around timing belt 16, and straight transmitting member 52 is fitted through the top and bottom holes, 42 and 44 respectively, in the top and bottom arms 38 and 40 of the bracket. The holes in both arms are the same size and transmitting member 52 is a straight cylindrical section, having upper and lower actuating heads 53 and 55 respectively, extending beyond upper and lower arms 38 and 40 respectively, of U-shaped bracket 32. Actuating heads 53 and 55 provide the capability to actuate devices on either side of the timing belt, either simultaneously or sequentially. Snap rings 54 are attached to transmitting member 52 outside of the top and bottom arms of U-shaped bracket 32 to lock transmitting member 52 in proper position.

Figure 5:
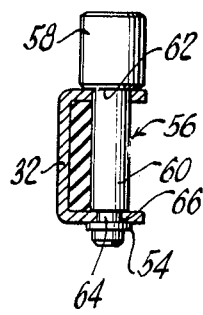
FIG. 5 is a sectional view of another embodiment of the invention, incorporating an enlarged actuating head.

FIG. 5 shows an embodiment of the invention in which U-shaped bracket 32 is made of a non-metallic material, such as rubber or hard plastic. The transmitting member 56 is formed in a cylindrical shape having shoulders to produce three sections of different diameters. The top portion or actuating head 58 of the transmitting member 56, extending above the U-shaped bracket 52, is fairly large in diameter and is connected to a narrower cylindrical member 60 which extends between the inner walls of the arms 38 and 40 of the bracket. The hole 42 in top arm 38 is larger than the hole 44 in the bottom arm 40 in order to accommodate intermediate section 60 of transmitting member 56. The shoulder 62 between intermediate section 60 and the large top section 58 of transmitting member 56 acts as the positioning means for the member against the outer surface of the upper arm 38. The third and narrowest section 64 of transmitting member 56 extends through the smaller bottom hole 44 in the bottom arm 40 of bracket 32. The shoulder 66 between middle section 60 and the smaller bottom section 64 of transmitting member 56 acts as the positioning means coacting with the inner wall of the bottom arm 40 of bracket 32. A locking ring 54 is fastened to the bottom section 64 of transmitting member 56 extending through bottom hole 44 in the bottom arm 40 to lock transmitting member 56 to U-shaped bracket 32.

Figure 6:
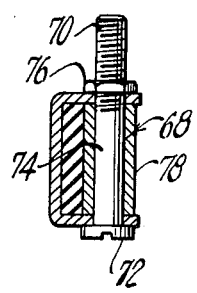
FIG. 6 is a sectional view of another embodiment of the invention, incorporating a threadable adjusting device.

FIG. 6 shows a non-metallic U-shaped bracket member 32 and a threaded screw-type transmitting member 68. The threaded section 70 of transmitting member 68 extends above the upper arm 38 of U-shaped member 32 and the enlarged head 72 of the screw-type device extends beyond the lower arm 40 of the U-shaped member. The shank 74 of the screw-type transmitting member 68 extends between the upper and lower arms of the U-shaped member and holds the U-shaped member in position to timing belt 16. A nut 76 is threadably engaged on the threaded portion 70 of transmitting member 68 to securely fasten transmitting member 68 to U-shaped bracket 32. A busing 78 is installed around the shank of the screw-type member between the arms of the U-shaped bracket. In addition to preventing wear between timing belt 16 and transmitting member 68, bushing member 78 acts as a spacer between the arms of U-shaped bracket 32 to allow nut 76 to be positively tightened without bending the U-shaped bracket. Additionally, bushing 78 acts as a spacer between transmitting member 68 and the groove formed by the teeth 22 of the timing belt to insure that the transmitting member is held securely in the groove to eliminate any backlash or relative movement of the transmitting member with respect to the belt.

Figure 7:
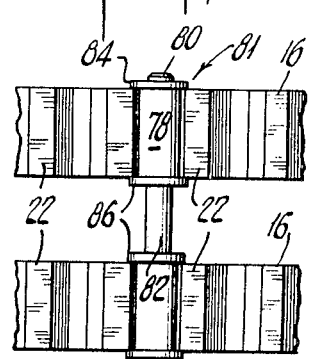
FIG. 7 is a plan view of another embodiment of the invention having two coacting timing belts.

FIG. 7 shows a timing belt assembly having the transmitting member 80 of the belt displacement transmission means suspended between parallel timing belts 16 mounted either on the same drive and driven pulleys or on spaced coaxial pulleys. This double timing belt assembly described above is especially adapted to applications in which the equipment coacting with the timing belt assembly exerts a relatively large force against the transmitting member.

The transmitting member 80 is connected at either end to fastening members 81 installed on each belt, with the actuating portion 82 of transmitting member 80 exposed between the separate timing belts. The fastening members 81 attached to each of the timing belts are the same U-shaped brackets 32 as previously described. The long transmitting member 80 extends from the outer leg 84 of one fastening member through the inner legs 86 of both fastening members to the outer leg of the other fastening member to rigidly secure the transmitting means to both of the belts. Any convenient locking means, such as locking rings 54 previously described, can be used to fix the position of transmitting means 80 with relation to the fastening members 81. As in previous embodiments of the invention described, the pulleys in the multiple timing belt assembly will have receptacle means to accommodate the transmitting member when the portion of the timing belt with the fastening means thereon engages the gear pulley.

It should be noted that timing belt assemblies incorporating timing belt displacement transmission means can be utilized in a wide variety of applications, including, but not limited to, modern office equipment. Wherever it is desirable to synchronize the operation of any equipment with a rotating shaft, a timing belt assembly built in accordance with the teachings of the present invention can easily be constructed to provide the proper synchronization.

The numerous embodiments of the belt displacement transmission means described herein in no way cover all the possible configurations. Many other embodiments of the invention can be produced by combining features of embodiments described above. For example, transmitting members having actuating portions which extend from both sides of the timing belt, can be combined with multiple belt arrangements as described, to further diversify the possible applications of the invention. Bushings can be included where appropriate, etc.

While the invention has been described with relation to timing belts in particular, it should be pointed out that there are several applications where the belt displacement transmission means could be effectively installed on belts other than timing belts and still operatively function to achieve the desired objectives. For example, fan belts, conveyor belts, and various other power transmission devices using belt drives could effectively employ the principles set forth in the present invention.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A belt and pulley assembly comprising:
   a pulley having a plurality of teeth on the periphery thereof,
   a timing belt operatively associated with said pulley, said belt having a plurality of teeth on one side thereof disposed for meshing with said teeth on said pulley and transverse grooves between adjacent teeth on said belt, and
   belt displacement transmission means connected to said belt including:
      a transmitting member in one of said grooves and extending transversely beyond the width of said belt, and
      means extending around the other side of said belt for fixedly clamping said transmitting member in said groove.

2. The belt and pulley assembly claimed in claim 1, further comprising receptacle means in said pulley to accommodate said belt displacement transmission means during engagement of the portion of said belt containing said transmission means with said pulley.

3. The belt and pulley assembly of claim 2 wherein the number of teeth on said belt is an integral multiple of the number of teeth on said pulley.

4. The belt and pulley assembly of claim 1 wherein said clamping means include a U-shaped member having arms disposed astride the width of said belt and means on each of said arms for engaging said transmitting member.

5. The belt and pulley assembly claimed in claim 4 wherein said transmitting member includes an actuating section extending beyond said U-shaped member.

6. The belt and pulley assembly claimed in claim 5 wherein said clamping means further comprise locking means fastened to said transmitting member to hold transmitting member in operative relation with said U-shaped member and said timing belt.

7. The belt and pulley assembly claimed in claim No. 6 wherein said locking means comprise snap rings connected to said transmitting member.

8. The belt and pulley assembly claimed in claim 6 wherein said locking means comprise:
   a threaded section on said transmitting member; and
   a nut threadably engaged on said threaded section and coacting with said U-shaped member;
and further comprising bushing means disposed about said transmitting member.

9. A belt and pulley assembly comprising:
   a pair of timing belts in parallel disposition, each of the said belts having a plurality of teeth on one side thereof and transverse grooves between adjacent teeth on said belts;
   a pulley operatively associated with each of said belts, each of said pulleys having a plurality of teeth on the periphery thereof for meshing with said teeth on the associated timing belt; and
   displacement transmission means including:
      a transmitting member extending from a first groove of the one of said belts to a record groove of the other said belts, and
      means on each of said belts extending around the other side of said belts for fixedly clamping said transmitting member in said first and second grooves.

* * * * *